(12) United States Patent
Zanella et al.

(10) Patent No.: US 7,691,219 B2
(45) Date of Patent: Apr. 6, 2010

(54) METHOD AND DEVICE FOR PRODUCING A HOLLOW BODY BY ROTATION AND RESULTING PRODUCTS

(75) Inventors: Guy Zanella, Cognin (FR); Christophe Ducret, Chambery (FR); Jacques Voiron, St Jean de Couz (FR)

(73) Assignee: OCV Intellectual Capital LLC DE (US)

( * ) Notice: Subject to any disclaimer, the term of this patent is extended or adjusted under 35 U.S.C. 154(b) by 822 days.

(21) Appl. No.: 10/519,949

(22) PCT Filed: Jun. 25, 2003

(86) PCT No.: PCT/FR03/01954

§ 371 (c)(1),
(2), (4) Date: Jul. 19, 2005

(87) PCT Pub. No.: WO2004/007179

PCT Pub. Date: Jan. 22, 2004

(65) Prior Publication Data

US 2005/0269017 A1    Dec. 8, 2005

(30) Foreign Application Priority Data

Jul. 4, 2002  (FR) .................................. 02 08419

(51) Int. Cl.
*B32B 37/00* (2006.01)
(52) U.S. Cl. ...................... 156/169; 156/166; 156/173; 156/175; 156/180; 156/242; 156/245
(58) Field of Classification Search ................ 156/166, 156/169, 173, 175, 180, 242, 245
See application file for complete search history.

(56) References Cited

U.S. PATENT DOCUMENTS

| 3,226,273 | A   |   | 12/1965 | Becker |            |
|-----------|-----|---|---------|--------|------------|
| 3,301,930 | A   | * | 1/1967  | Boggs  | 264/137    |
| 3,529,050 | A   | * | 9/1970  | Smith  | 264/137    |
| 3,874,972 | A   |   | 4/1975  | Wesgh  |            |
| 3,938,929 | A   |   | 2/1976  | Stent  |            |
| 4,680,224 | A   | * | 7/1987  | O'Connor | 428/298.1 |
| 5,055,242 | A   | * | 10/1991 | Vane   | 264/463    |
| 6,605,171 | B1  | * | 8/2003  | Debalme et al. | 156/172 |

FOREIGN PATENT DOCUMENTS

| DE | 198 52 159      |   | 2/2000  |
|----|-----------------|---|---------|
| EP | 0 816 050       |   | 1/1998  |
| FR | 2 784 930       |   | 4/2000  |
| FR | 2 807 966       |   | 10/2001 |
| GB | 2041489 A       | * | 9/1980  |
| JP | 2001-113550 A   | * | 4/2001  |
| WO | 99 12716        |   | 3/1999  |
| WO | WO-00/47397 A1  | * | 8/2000  |

OTHER PUBLICATIONS

Machine translation of German Patent DE 19852159 dated Feb. 24, 2000.*

Internet website pages from http://www.twintex.com/fabrication-processes/tw-process.html, dentitled Saint Gobain, Twintex Processing, dated Jul. 30, 2001.*

Haupert, F. et al: "Neues Fertigungs-Verfahren Fuer Mochleistungs-Verbundwerkstoff-Gleitlager" Kunststoffberater, vol. 41, No. 11, pp. 37-39, Nov. 1, 1996.

* cited by examiner

*Primary Examiner*—Jeff H Aftergut
(74) *Attorney, Agent, or Firm*—James J. Dottavio; Kathryn W. Grant

(57) ABSTRACT

A method and device for manufacturing a body, a device for implementing the method, and products obtained by the method. In the method, at least a first heated composite strip is introduced into at least one die, and at the same time, at least one molten material is introduced into the die in contact with the first composite strip, to obtain at least one second composite strip, and the second composite strip is wound around a support rotating about its axis.

19 Claims, 1 Drawing Sheet

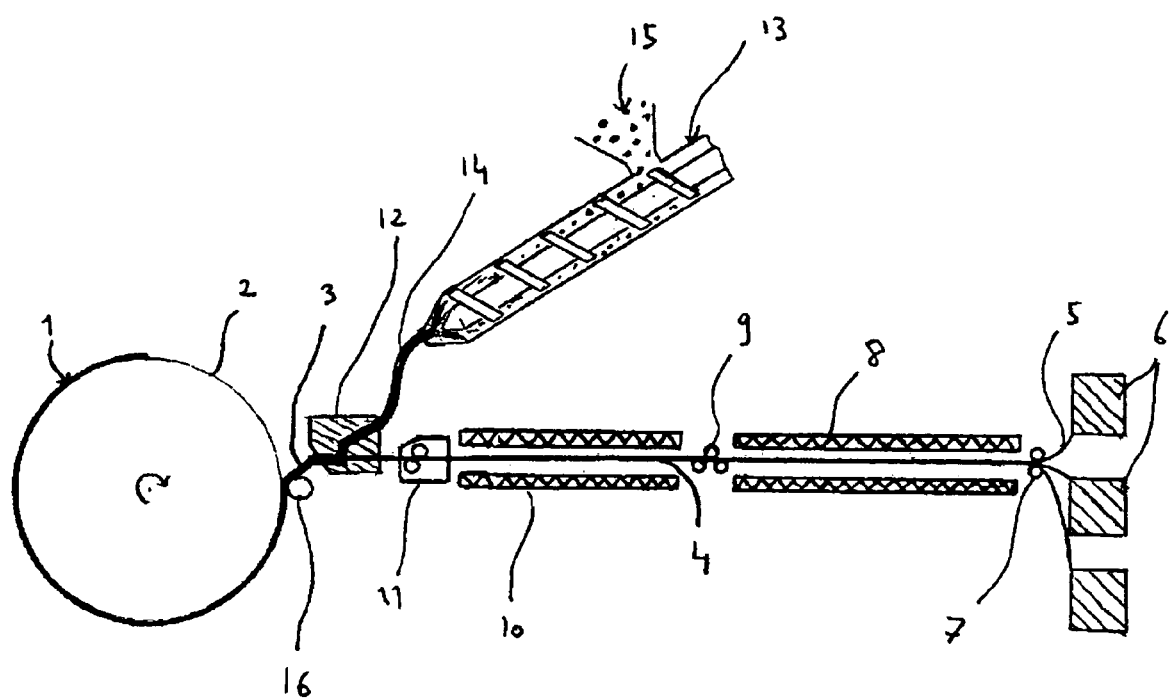

METHOD AND DEVICE FOR PRODUCING A HOLLOW BODY BY ROTATION AND RESULTING PRODUCTS

The present invention relates to a body of revolution formed of at least one organic thermoplastic reinforced with continuous glass strands wound around the axis of the body.

Although not limited to such an application, the invention will be more particularly described with reference to the manufacture of pipes of all types, particularly those used for transporting fluids under pressure.

Another advantageous application is the manufacture of reservoirs intended to contain fluids, particularly under pressure.

The manufacture of a body of revolution based on at least one organic thermoplastic reinforced with continuous glass strands wound around the axis of the body has already been described in patent application WO 00/24566. In that application, a heated ribbon based on an organic thermoplastic and on continuous glass strands is wound around a rotating tube, while at the same time heating part of the surface of the tube covered with the ribbon and applying pressure downstream of this heated part. The ribbon is generally obtained from continuous co mingled strands consisting of glass filaments and filaments of organic thermoplastic intimately mingled, the most common version of these strands, marketed under the trade name TWINTEX® by SAINT-GOBAIN VETROTEX FRANCE, having a weight ratio, in percentage terms, of 60 or 75 glass and 40 or 25 organic thermoplastic.

While the above method and the products obtained perform well, certain limits or constraints arise in use: the constraint of the additional operations of heating and pressing onto the tube in order to achieve uniform deposition of the ribbon, the necessary addition of a liner for food grade applications or of an external covering for better resistance to abrasion, a rather narrow and not very variable range of products obtained.

The purpose of the present invention is to alleviate the aforesaid disadvantages and in particular to propose a more varied range of products which may, for example, exhibit reinforcement contents that differ across the same product, or in which the content can be "customized" without significant disruption, particularly in terms of the method or the devices employed.

This object is achieved by the method according to the invention which comprises at least the following steps:
- at least a first heated composite strip is introduced into at least one die,
- at the same time, at least one molten material is introduced into said die in contact with said first composite strip, so as to obtain at least one second composite strip,
- said second composite strip is wound around a support rotating about its axis.

The present invention also relates to a device for manufacturing a body of revolution, characterized in that it comprises:
- one or more means for producing at least one first heated composite strip,
- at least one die for simultaneously receiving at least the first composite strip and at least one molten material in contact with said first composite strip, so as to obtain at least one second composite strip,
- one or more means for winding said second composite strip about a support rotating about its axis.

Another subject of the invention is a composite body of revolution, particularly one obtained by the above method. This body has at least one region formed solely by the winding of a composite strip, this region having, as the case may be, variable reinforcement content (or differentiated or adjustable or variable reinforcement content), particularly a reinforcement content that varies along the axis of revolution and/or according to the thickness of the body of revolution, and/or this region having a low reinforcement content, particularly by comparison with the reinforcement content in the starting composite product or products or in the first composite strip used (for example a reinforcement content of below 75 wt % in the case of a first strip having a reinforcement content of 75% or a reinforcement content of below 60 wt % in the case of a first strip having a reinforcement content of 60%) and/or a reinforcement content that is lower by comparison with that of the reinforced regions obtained by winding in current bodies of revolution (for example a reinforcement content representing under 60 wt % of said region), and/or at least some of the reinforcement in this region having an off-centered position within the organic material in which it is embedded and/or the reinforcement in this region being embedded in at least two different materials and/or this region being able to be in direct contact (without functional covering, for example protective or esthetic) with the inside (for example a fluid in the case of a hollow body of revolution intended to carry said fluid or for example a filler foam in the case of a solid body) and/or with the outside of the body of revolution.

In the present invention, the sheathing of the composite strip with a second material, known as dilution material, has numerous advantages: by reducing the ratio of reinforcing material to organic material in the strip wound onto the rotating support it allows more homogeneous deposition and better integrity of said strip without the need for additional heating or the application of additional pressure to the deposited strip; through a suitable choice of sheathing material, it avoids the subsequent addition of an internal covering (liner) (for example for food applications) or an external covering (for example an anticorrosion covering); more generally, through the choice of the sheathing material it is possible to confer additional properties (anti-UV, sealing, anti-corrosion, etc. properties) on the body of revolution; it allows a continuous adjustment of the reinforcement content by varying, on-line (during the manufacture of the body) the amount of sheathing material delivered and thus makes it possible to obtain bodies having reinforcement contents that differ from a starting product which may itself advantageously not vary.

The method and the products according to the invention therefore have the advantage of being variable, this being achievable without changing the starting products. Furthermore, the method according to the invention is easy and quick to implement and is economical. The body according to the invention also has, at least in its region obtained by winding, perfect cohesion between the various elements of which it is made (or as appropriate, perfect continuity of the organic parts), the union between the various elements being sufficiently close to guarantee particularly satisfactory life and strength/resistance.

In the method according to the invention, the first composite strip comprises at least one reinforcing material (glass, carbon, aramid, etc.) and at least one organic thermoplastic. The reinforcing material (preferably glass) is preferably in the form at least of strands and/or filaments that are continuous in the longitudinal direction of the strip. The strands or filaments of reinforcing material are advantageously bound together by the organic thermoplastic, itself preferably in the form of strands and/or filaments and/or by other reinforcing strands and/or filaments (case of woven or crossed reinforcements strips). As a preference, the strip is obtained from composite strands formed of reinforcing filaments (preferably glass filaments) and filaments of at least one organic thermoplastic, these various filaments advantageously being intimately mingled, the intimate structure of these strands facilitating the impregnation of the glass fibers with the thermoplastic, particularly making it possible to form a consolidated strip (that is to say one which has cohesion and integrity that allow it to be handled without damage) which is very homogeneous. Advantageous composite strands may be obtained according to a direct method such as the one described in patents EP 0 367 661, WO 98/01751 or EP 0 599 695, the strands according to that method having the advantage of having an excellent co mingling index leading to an excellent distribution of glass strands within the thermoplastic, as explained in patent application WO00/24566.

The first composite strip generally has a width of about 1 to 10 cm and may be essentially flat or adopt a shape of a more complicated cross section where each portion is likened to a strip. The strip may be flexible, particularly able to be wound when the strip is substantially flat, or somewhat rigid. The use of a composite ribbon rather than of a composite strand has numerous advantages, particularly in terms of the distribution of the glass filaments through the thermoplastic within the end-product and of convenience of use. As a preference, the first strip as it enters the die has not only longitudinal continuity but also transverse continuity, and in particular has a void volumetric ratio of less than 5% (or even less than 3%, or even better, less than 0.5%). The void volumetric ratio can be measured in a known way using a micrographic method of the image analysis type, or calculated using a formula as explained in patent application WO 00/24566.

The first composite strip comprises at least one organic thermoplastic, herein called first material, this material for example being chosen from polyolefins, particularly polyethylene (PE), polypropylene (PP), polyesters, particularly polyethylene terephthalate, polybutylene terephthalate, elastomers, particularly an ethylene propylene polymer (EPDM) or polyvinyl chloride (PVC), or polyamides, etc., some of these materials (especially polyethylene) having the advantage of being chemically inert and compatible from the foodstuffs point of view, of being able to withstand very low temperatures and of having a low cost price.

The first strip is generally made of continuous composite strands extracted from winding(s) and assembled in parallel (or roughly in parallel) into at least one layer (or sheet or web), and/or possibly from layer(s) of woven or crossed composite strands. In order to obtain at least one composite strip according to the invention, the layer of strands (or, as appropriate, at least one of these layers) is introduced into a region where it is heated to a temperature at least reaching the melting point of the first thermoplastic (and below the temperature at which said material degrades and below the temperature at which the reinforcing fibers soften), then the layer of heated strands (generally contiguous) passes into an impregnation device where the molten first thermoplastic is distributed uniformly and the reinforcing fibers are impregnated therewith.

This then yields a strip which has a transverse continuity, it being possible for this strip possibly to undergo a step, in addition to or at the same time as impregnation, of shaping, so as to obtain the desired profile.

It goes without saying that several disjointed layers may also be formed, as may several disjointed strips, and at least one of these strips being introduced into at least one die according to the method according to the invention.

Advantageously, a step of regulating the tension in the strands may be provided (for example as they are gathered together into layer(s) or bundles or before they are gathered together) and/or the strands may be rid of any static electricity, for example before the web passes into the heating region.

The method according to the invention may comprise a step of forming the first strip as mentioned above or use one or more strips that have already been formed, the strip or strips in the latter case being heated up (and possibly shaped to a particular profile) in an earlier step of heating to a temperature that at least reaches the melting point of the first thermoplastic, before entering the die. As a preference, the method according to the invention uses only by way of starting product composite strands and thus comprises a prior step of forming the strip, as seen above. The first composite strip or the strip obtained at the exit from the impregnation device as described hereinabove is advantageously maintained at temperature at a temperature close to the melting point of the first thermoplastic (or a temperature at which the first thermoplastic is malleable) as far as the die or as far as the second-strip singular or plural winding means (such as the laying head) mentioned in the invention.

According to the method according to the invention, the first strip is introduced into at least one die also fed with a molten material herein called the second material (or dilution material or sheathing material). This second material may be identical to or differ from the first organic material of which the strip is formed. It may also be composite. It may have particular properties or contain additives or fillers giving it particular properties (for example sawdust in order to give a wooden appearance, an additive improving the resistance to hydrocarbons, it may also be filled with talc, long or short glass fibers, etc.). As a preference, the second material comprises at least one organic or plastic material, advantageously thermoplastic, for example a polyolefin (particularly polyethylene or polypropylene) or polyvinyl chloride or may possibly contain a thermosetting material such as a polyurethane, or an elastomer, for example a SEBS (styrene ethylene butadiene styrene) modified polypropylene. Advantageously, the second material is chosen to be identical to, similar to or chemically compatible with the first material (so that there is good adhesion, or even continuity, between the two materials) of which the first strip is formed, this second material being able possibly to be filled with additives such as those mentioned above (sawdust, glass fibers, talc, etc.).

Depending on the material chosen, the second material may simply serve to dilute, or may additionally confer additional properties upon the second strip formed. The second strip formed thus preferably contains a reinforcing material content of between 0 and 74 wt % of the strip, and preferably of between 1 and 60 wt %, or even between 5 and 55 wt % (the strands used themselves generally having a reinforcing content of 60 or 75 wt %) over at least a certain part of its length, it also being possible for this content to vary along the length of the strip.

The application of the second material also allows better consolidation of the first strip, the second strip obtained being somewhat formed of at least one second material reinforced with at least one first composite strip. When said first strip is obtained from strands which are themselves composite, the second material adheres to the first strip in a particularly satisfactory way (or even, especially in the case of the same material, fuses with the first material of the first strip), this being the case for various materials. The second strip thus advantageously comprises at least one first strip of continuous reinforcing fibers arranged roughly parallel and contiguous and secured together by at least one first thermoplastic, and at least one second material in intimate contact with said first strip. As mentioned above, when the first material and the second are identical, the two materials are perfectly fused within the body of revolution obtained.

In the method and the device according to the invention, the second material introduced into the die may come, for example, from an extrusion device. It is possible to have perfect control over the amount of material to be added and over the shape to be given to the second strip, it being possible for this shape to be conferred in particular by the die (and possibly by an additional shaping device). Depending on the embodiment, the first strip may be deformed as it enters the die, then acting as a shaping device, and coated with the second material, or may simply be coated with the second material to complete the shape conferred by the die (and possibly may pass through an additional shaping device). As a preference, the die both allows positioning of the first strip and sizing (or shaping) of the cross section of the second strip.

The first strip (or the first strips if there are several of them introduced into one or several dies) may also be coated with several identical or different materials feeding into the die (or, as appropriate, into several dies in series or in parallel), this method allowing further broadening of the range of products obtained. When several second strips are obtained in parallel, the sheathing material can vary from one strip to another, as well as within each strip, the various strips then being wound onto the rotating support. In the method according to the invention, by varying the feed of the various materials, it is therefore possible to obtain not only bodies with differing reinforcement contents but also varying mixtures of material along the axis of revolution and/or through the thickness.

The second strip (or the second strips if there are several of these) formed in the method according to the invention may advantageously be wound directly onto a mandrel (the desired properties if necessary being present in situ in the wound strip according to the invention) but winding it onto a tube or liner intended to form an internal part of the body of revolution or onto a support such as a block of foam, and/or adding an outer covering to the winding obtained is/are not precluded, it being possible for this covering to be applied for example in the form of a film or of a strip which is wound, etc. The second strip according to the invention may also be wound onto a support already covered with a first winding (in the form, for example, of an organic strip). Incidentally it is not necessary (although this is not precluded) for the second strip to be heated up and/or for pressure to be applied to it while it is being wound.

The second strip may be wound forming contiguous turns, turns which are spaced apart or turns which overlap each other at least in part. The winding of the strip or strips may be done more or less transversely, and generally this is done helically, the angle of the strip with respect to the axis of the body being able to change according to the position along the axis and being dictated by the laying head on the basis in particular of the desired mechanical properties as mentioned later on. Each turn of the support may see the deposition of one or more turns of strip, over all or part of the length of the support, the next turn possibly seeing the orientation of the next turn or turns of strip change. It is thus possible to obtain structures with very dense windings, lappings, or loose windings resembling screw flights.

As indicated previously, the present invention also relates to a device for implementing the method described above. This device particularly comprises one or more means for forming a composite strip or one or more means for delivering (and/or driving) and heating (and possibly for impregnating and/or shaping) a layer or strip already formed. When the body of revolution according to the invention is made continuously from windings of composite strands, these means may in particular comprise:

one or more means for driving and assembling the strands in the form of at least one bundle (or layer) of parallel strands;
one or more means for heating said bundle;
at least one device for impregnating the heated bundle so as to obtain a strip, for example a densified and laminated flat strip;
one or more means for keeping the strip at temperature at least as far as the die.

The device may also comprise a creel from which the reels of strands are unwound and at least one roller guiding the strands.

The means for assembling the strands into the form of at least one bundle of parallel strands may for example consist of a holed plate and/or a comb the teeth of which allow the strands to be aligned parallel with uniform spacings.

One or more means for regulating the tension of the strands may possibly be provided, for example upstream of the assembling means.

Also, an anti-static device may be provided, for example upstream of the heating means.

In general, the device comprises one or more heating means consisting of one or more ovens, particularly of the infrared type, preferably operating with lamps the power of which are set according to the temperature of the strip, this kind of oven having the advantage of being both high-performance in terms of energy usage and easy to regulate.

The impregnation device may, by way of example, comprise three members arranged in a triangle and between which the bundle passes, the member separation height being adapted to establish appropriate pressure on the surface of the bundle. The members may be heated rolls (or bars), able to move or fixed. Advantageously, each roll may comprise a blade for scraping the molten thermoplastic deposited on the roll after the bundle has passed.

The impregnation device may also act as a shaping device or be followed by one or more additional shaping devices so as to convert the bundle of strands or the strip formed into at least one strip of chosen cross section. This shaping device may, for example, comprise a heated die and/or rollers between which the bundle of strands or the strip, respectively, passes.

A device, for example a shaping device, may also center the web, particularly before the strip is formed, and for example may comprise a lower roller and a top roller of appropriate shape (for example of hyperboloid shape, or one fitted with rims) and rotating in opposite directions, the layer of strands being concentrated about the central axis of travel as it passes between the two rollers, so as to deliver a bundle of contiguous strands.

The device according to the invention also comprises at least one die, herein called the sheathing die, preferably sized to the cross section of the second strip that is to be obtained, and into which there can be introduced simultaneously at least one first strip and at least one molten second material in contact with the strip so as to obtain a second strip consisting of at least one second material reinforced with at least one first strip.

The device according to the invention possibly comprises upstream of said die or this die itself comprises means for positioning and/or shaping at least one strip for the bringing into contact with at least one second material.

Said die may also comprise means for bringing the second material into contact with the strip and applying additional pressure thereto. The second material (or the second materials when there are several of these) may come into contact with the first strip via various ports in the die. Depending on the cross section of the die and/or on the presence of various ports and/or on the application of additional pressure(s) and/or on the position of the first strip in the die, the amount of second material(s) delivered may differ at the various points on the cross section of the strip, for example more material may be deposited on one side of the first strip than on the other, thus leading to an off-centering of the reinforcing material within the second strip formed.

As a preference, the device according to the invention comprises at least one extruder applying at least a molten second material to the sheathing die or dies.

The device according to the invention also comprises one or more winding means, these means comprising, for example, a laying head which positions the strip and facilitates its placement. The laying head may be able to move and may be made to rotate; it may for example be formed of rotary or fixed self-cleaning rollers that, for example, center the strip, as described later on with reference to the figures.

As a preference, the sheathing die mentioned according to the invention (or at least one of the sheathing dies when there are several of these) lies at the outlet from the laying head already mentioned and before the support onto which the second strip is to be wound.

Although not necessary, the device may also comprise one or more means (for example a hot air blowing nozzle) to at least superficially heat the strip in a region near the support rotating about its axis or downstream of the region of contact between the strip and the support and/or one or more means for applying local pressure (for example in the form of at least one rotary roller) to the part of the external peripheral surface of the support covered with the strip, for example in a region situated immediately downstream of the above heated region. As indicated before, the rotating support may, for example, be a mandrel, it being possible for this mandrel to be heated or not heated, or a tube (or solid insert or a component to be consolidated) which may or may not form part of the body of revolution obtained.

The various elements of the device according to the invention may be fixed or able to move (in translation and/or in rotation).

The body of revolution according to the invention is generally hollow, and its wall comprises at least one reinforcing material in continuous form, generally wound helically about the (longitudinal) axis of revolution of the body, and at least one organic thermoplastic (in which the reinforcing material is generally embedded). The continuous reinforcing strands embedded in the organic material may for example, at least in the case of some of them, make an angle of the order of 15° with the axis of said body, or, according to another advantageous embodiment, may make an angle of between 50 and 55° with the axis of said body, this arrangement making it possible to increase the axial and circumferential strength resistance of the body to the pressure exerted by a fluid flowing or contained inside for the same quantity of continuous glass strand used. According to another advantageous variant, at least some of the continuous reinforcing strands embedded in the organic thermoplastic make an angle of close to 90° with the axis of the body and other continuous reinforcing strands are embedded in the organic material while being arranged longitudinally along the axis of the body.

The choice between these variants, the combining thereof or the selection of another variant giving precedence to a different angle of winding of the continuous reinforcing strands, and the choice of the respective quantities of the reinforcing strands in the direction in which they are arranged is made on the basis of the specific constraints associated with each application, such as resistance to pressure, resistance to ovalization, bending strength, tensile strength, etc.

According to an advantageous embodiment, the wall of the body of revolution according to the invention is essentially or even entirely formed by the second wound strip.

The invention also relates to a structure, for example a composite pipe, formed of the body of revolution defined hereinabove and covered for example with one or more finishing layers (by winding, coextrusion, etc.) particularly made of organic thermoplastic and/or equipped with additional elements (such as fittings on the ends, secured, for example, by welding or bonding, or at least a liner, etc.).

The body or the structure according to the invention are particularly well suited to containing and/or conveying pressurized fluids.

Other advantages and characteristics will now be described with reference to the attached FIGURE depicting a schematic view of a device for manufacturing a body of revolution according to the invention. For purposes of clarity, the various parts are not necessarily drawn to scale.

The device depicted allows the manufacture of a body of revolution 1 according to the invention formed by the winding around the mandrel 2 of a composite strip 3 formed of a first strip 4 formed of reinforcing filaments arranged parallel and contiguous and secured together by a first thermoplastic, this strip being embedded in a second plastic in intimate contact with said strip.

The strip is formed from composite strands 5 such as the strands marketed by SAINT GOBAIN VETROTEX FRANCE under the trade name TWINTEX® and manufactured for example using the method described in patent EP 0 599 695, these strands consisting of glass filaments and filaments of an organic thermoplastic, of the polyolefin or polyester type, intimately co mingled.

These strands are unwound from windings 6 placed on a creel (not depicted). This creel may, for example, be the one described in patent application WO 00/24566. These strands are then assembled in parallel using one or more devices (depicted symbolically by 7) such as one or more comb(s) and/or holed plate(s) and/or grooved rollers and/or bar sets, etc. One or more means for regulating tension and/or for detecting movement and/or for removing static may also be provided, for example at the creel and/or at various points in the pre-formation path of the strip. For example, the device according to the invention may comprise the sequence of means described under reference 75 in patent application WO 00/24566 between the creel and the first oven 8. The strands assembled in parallel and contiguously pass through a first oven or first series of infrared ovens 8 where they are heated to a temperature that at least reaches the melting point of the first thermoplastic, then the layer of heated strands passes through an impregnation device 9 which, by flattening the layer (or bundle), makes it possible to obtain a first strip or ribbon by removing the air contained between the strands to make the material more dense and by completely embedding the glass filaments in the thermoplastic. The impregnation device 9 for example consists of three mutually parallel heated rolls arranged in a triangle, the upper roll being adjustable in terms of height so that the strip can be flattened to a greater or lesser extent.

The first heated strip thus formed is kept at temperature by passing through a second oven or a second series of ovens 10 as far as the laying head 11, this head advantageously being able to pivot so as to change the lay angle of the ribbon. This head may, for example, be the one described under reference 71 in patent application WO 00/24566. On leaving the laying head and just before coming into contact with the mandrel, the first strip is introduced into a die 12 in which it is coated with a second material, this second material in the molten state coming from an extruder 13 and feeding the die via, for example, a flexible pipe 14. The second material is identical to or different from the first material and is introduced into the extruder in the form of granules 15 and/or strands, etc. The second strip 3 thus formed by sheathing the first strip is then wound around the mandrel rotating about its axis (here for example in the direction indicated by the arrow), a roller 16 adjacent to the mandrel also possibly assisting with the application of the second strip (it being possible for this roller to be considered as forming part of the laying device or not).

The bodies of revolution obtained according to the invention can be used in various applications, such as the transportation or storage of fluids.

The invention claimed is:

1. A method for manufacturing a body of revolution comprising:
    introducing at least one first heated composite strip formed of intimately mingled continuous strands formed of glass filaments and filaments of organic thermoplastic into at least one die, said first composite strip having a width from about 1 to about 10 cm;
    simultaneously feeding at least one molten material into the die to obtain at least one second composite strip, said second composite strip being formed of said molten material reinforced with said at least one first composite strip; and
    winding the second composite strip around a support rotating about its axis,
    wherein an amount of said molten material deposited on one side of said first strip is greater than an amount of said molten material deposited on a second side of said first strip, resulting in an off-centering of said glass filaments within said second composite strip.

2. The method as claimed in claim 1, wherein the first strip has a void volumetric ratio of less than 5%.

3. The method as claimed in claim 1, wherein the first strip is obtained by assembling continuous composite strands in parallel into at least one layer, introducing the at least one layer into a region where it is heated to a temperature at least meeting a melting point of the organic thermoplastic, then by passing the at least one layer of heated strands through an impregnation device to homogeneously distribute the molten organic thermoplastic and impregnate the glass fibers therewith.

4. The method as claimed in claim 1, wherein the first strip is heated to and/or kept at a temperature as far as the die or as far as a mechanism for winding the second strip.

5. The method as claimed in claim 1, wherein the second strip has a glass filament content of between 0 and 60 wt % of the second strip over at least a certain part of its length, the content being variable along the length of the second strip.

6. The method as claimed in claim 1, wherein the molten material is introduced into the die after conditioned by an extrusion device.

7. The method as claimed in claim 1, wherein the second composite strip is wound around the support without additional heating of the wound strip.

8. The method as claimed in claim 1, wherein the second composite strip is wound around the support without applying additional pressure to the wound strip.

9. A method for manufacturing a body of revolution, comprising:
    heating a first composite strip containing a first wt % amount of reinforcing material;
    simultaneously providing the heated first composite strip and a molten material to a die to form a second composite strip containing a second wt % amount of reinforcing material;
    varying the amount of molten material provided to the die in-line to vary the second Wt % amount of reinforcing material contained in the second composite strip and
    then depositing the second composite strip around a support rotating about its axis,
    wherein said second wt % amount of reinforcing material is varied along the length of said rotating support.

10. The method of claim 9, wherein the second wt % amount of reinforcing material is varied along the length of the second strip.

11. The method of claim 9, wherein the second composite strip is deposited around the support without additional heating of the wound strip.

12. The method of claim 9, wherein the second composite strip is wound around the support without applying additional pressure to the wound strip.

13. The method of claim 9, wherein the die positions the first strip and sizes the cross section of the second strip.

14. A method for manufacturing a body of revolution, comprising:
    heating at least one first composite strip containing a first amount of reinforcing material, said first composite strip being formed of intimately mingled continuous strands formed of glass filaments and organic thermoplastic filaments;
    passing said heated first composite strip through pivotable laying device to position a lay angle of said first composite strip;
    simultaneously providing said heated first composite strip and a molten organic material to at least one sheathing die to form a second composite strip, said second composite strip comprising organic material formed from said organic thermoplastic filaments and said molten organic material reinforced with said glass filaments;
    winding said second composite strip around a support rotating about its axis,
    wherein said molten material reduces the ratio of said glass filaments to said organic material in said second composite strip and permits said winding of said second composite strip around said support without additional heating or additional pressure, and
    wherein the amount of said molten material provided to said die is varied in-line to vary the wt % amount of reinforcing material contained in said second composite strip.

15. The method of claim 14, wherein an amount of molten material deposited on one side of said first composite strip is greater than an amount of molten material deposited on a second side of said first composite strip, resulting in an off-centering of said reinforcing material within said second composite strip.

16. The method of claim 15, wherein said first composite strip has a void volumetric ratio of less than 5%.

17. The method of claim 15, wherein a thickness of said body of revolution varies along a length of said body of revolution.

18. The method of claim 14, wherein said molten material is introduced into said die after being conditioned by an extrusion device, said molten material containing additives to confer a desired property or properties to said body of revolution.

19. The method of claim 14, wherein a plurality of said first composite strips and a plurality of said sheathing dies are utilized to form a said second composite strip.

* * * * *